United States Patent [19]

Rude et al.

[11] Patent Number: 4,750,398
[45] Date of Patent: Jun. 14, 1988

[54] CHORD SPELLER

[76] Inventors: Kenneth L. Rude, c/o George Spector, 233 Broadway RM 3615; George Spector, 233 Broadway RM 3615, both of New York, N.Y. 10007

[21] Appl. No.: 897,725
[22] Filed: Aug. 18, 1986
[51] Int. Cl.⁴ ............................................. G09B 15/02
[52] U.S. Cl. .................. 84/473; 235/70 R; 235/85 R
[58] Field of Search ............... 84/473; 235/70 R, 70 B
[56] References Cited

U.S. PATENT DOCUMENTS 2,190,472  2/1940  Ferrughelli ................ 235/70 R
4,552,052 11/1985  Lee ............................. 84/473

FOREIGN PATENT DOCUMENTS 717683 11/1954  United Kingdom ............ 84/473

Primary Examiner—Lawrence R. Franklin

[57] ABSTRACT

A chord speller is provided and consists of a housing with a vertical slide member and a horizontal slide member intersecting and overlapping the vertical slide member. The horizontal slide member has a plurality of musical notes thereon while the vertical slide member has a plurality of musical chords and indicators showing which of the musical notes are needed for making each of the musical chords.

1 Claim, 1 Drawing Sheet

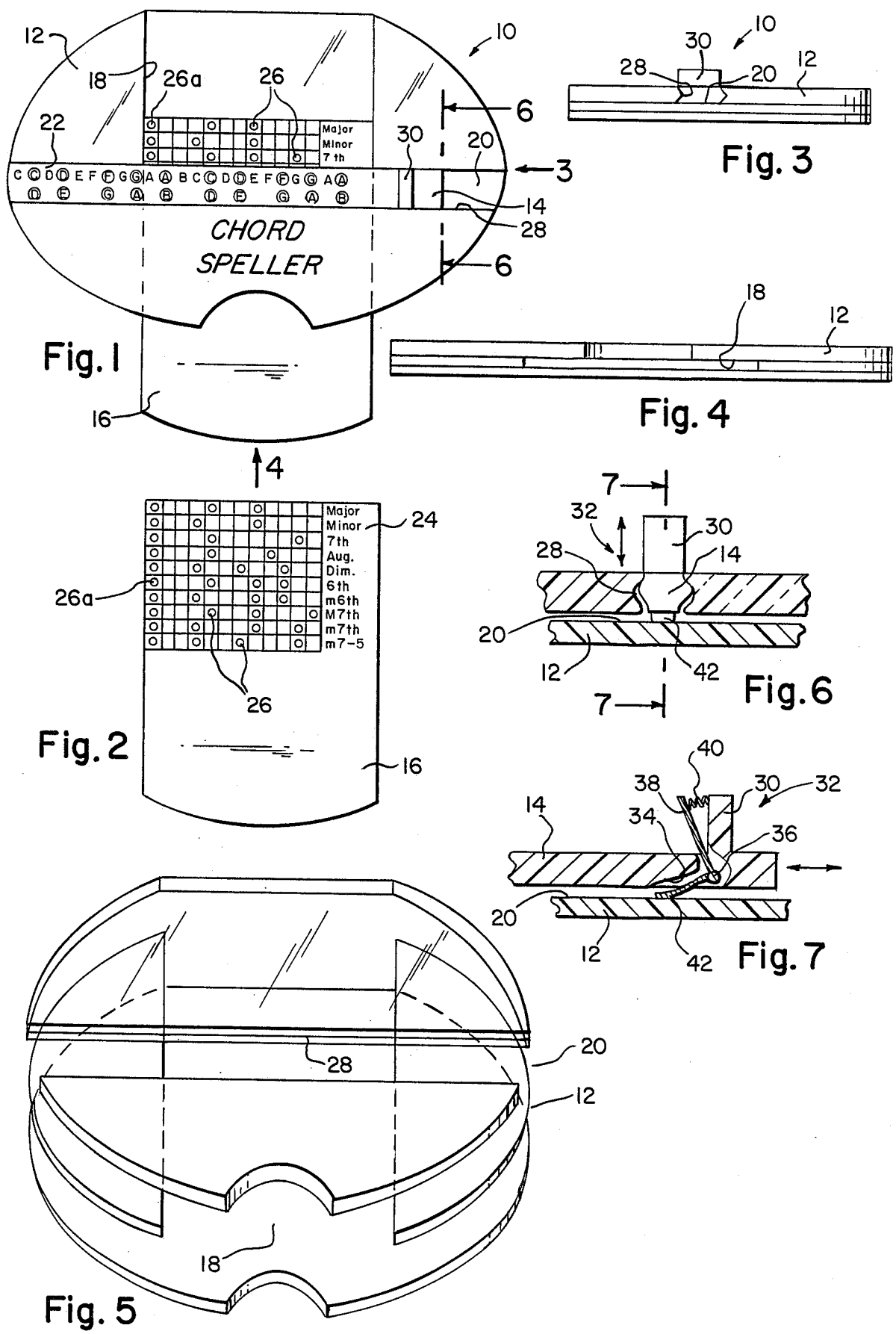

CHORD SPELLER

BACKGROUND OF THE INVENTION

The instant invention relates generally to chord teaching devices and more specifically it relates to a chord speller.

Numerous chord teaching devices have been provided in prior art that are adapted to indicate the proper choras especially for stringed fingerboard instruments. For example U.S. Pat. Nos. 3,785,240; 3,791,254; 4,069,737 and 4,289,057 all are illustrative of such prior art. While these units may be suitable for the particular purpose to which they address, they would not be as suitable for the purposes of the present invention as heretofore described.

SUMMARY OF THE INVENTION

A principle object of the present invention is to provide a chord speller that will overcome the shortcomings of the prior art devices.

Another object is to provide a chord speller that is designed to enable anyone to play the appropriate chords as shown by the chord symbols on most modern music.

An additional object is to provide a chord speller that has a built in locking device within a horizontal slide member so as to hold the horizontal slide member in proper alignment with a vertical slide member to read the notes of the desired chord.

A further object is to provide a chord speller that is simple and easy to use.

A still further object is to provide a chord speller that is economical in cost to manufacture.

Further objects of the invention will appear as the description proceeds.

To accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a top view of the invention.

FIG. 2 is a top view of the vertical slide.

FIG. 3 is a side view taken in the direction of arrow 3 in FIG. 1.

FIG. 4 is a front view taken in the direction of arrow 4 in FIG. 1.

FIG. 5 is an exploded perspective view showing how the frame is fabricated.

FIG. 6 is a partial cross sectional view taken along line 6—6 in FIG. 1 showing a modified horizontal slide.

FIG. 7 is a partial cross section view taken along line 7—7 in FIG. 6 of the modified horizontal slide having a locking position device therein.

DETAILED DESCRIPTION OF THE PREFERRED EMBODIMENTS

Turning now descriptively to the drawings, in which similar reference characters denot similar elements throughout the several views, FIGS. 1 through 5 illustrate a chord speller 10 that contains a housing 12, a horizontal slide member 14 and a vertical slide member 16.

The housing 12 has a vertical slot 18 and an intersecting overlapping horizontal slot 20 therein.

The horizontal slide member 14 has indicia thereon indicating a plurality of musical notes 22. The horizontal slide member 14 is slideable within the horizontal slot 20 in the housing 12 to position the musical notes 22 in a particular arrangement.

The vertical slide member 16 has indicia thereon illustrating a plurality of musical chords 24 and indicators 26 showing which of the musical notes 22 are needed for making each of the musical chords 24. The vertical slide member 16 is slideable within the vertical slot 18 in the housing 12. Each of the musical chords 24 can be viewed along with the respective indicators 26 above the musical notes 22 on the horizontal slide member 14.

The housing 12 further has a transparent window over the vertical slot 18 above the intersecting over-lapping horizontal slot 20 so that the vertical slide member indicia 24 and 26 can be viewed therethrough.

The horizontal slot 20 in the housing 12 and the horizontal slide member 14 further includes a tongue and groove track 28. A finger grip 30 is formed on one end of the horizontal slide member 14 to assit in moving the horizontal slide member along the tongue and groove track 28 in the housing 12.

FIGS. 6 and 7 shows a locking position device 32 therein which includes the horizontal slide member 14 having a clearance hole 34 formed adjacent the finger grip 30. A pivot pin 36 is mounted within the clearance hole 34 of the horizontal slide member 14.

A handle 38 is secured to the pivot pin 36 and extends outwardly from the clearance hole 34 of the horizontal slide member 14.

A return spring 40 is positioed between free end of the handle 38 and the finger grip 30. A leaf spring 42 is secured to the pivot pin 36 at a generally right angle to the handle 38 to press against the housing 12 in the horizontal slot 20 for biasing the horizontal slide member 14 up within the tongue and groove track 28.

To operate the chord speller 10 as shown in FIG. 1 a person will simply move the vertical slide member 16 to indicate the desired musical chord 24 wanted. The horizontal slide member 14 is moved to place a key signature by putting one of the musical notes 22 in alignment with the left hand column of indicators 26a of the vertical slide member 16. The musical notes 22 of the desired musical chord 24 are then indicated by the indicators 26 on the vertical slide member 16. In the example shown in FIG. 1, the chord speller 10 indicates the key of A 7th and the notes to be played are A—C#—E—G.

Notes may be played in any inversion to facilitate fingering and to produce the most pleasing sound effect on the horizontal slide member 14 the upper circled letter indicates a sharp while the lower circled letter indicated a flat.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A chord speller which comprises:

(a) a housing having a vertical slot and an intersecting overlapping horizontal slot therein;
(b) a horizontal slide member having indicia thereon indicating a plurality of musical notes, said horizontal slide member slideable within said horizontal slot in said housing to position said musical notes in a particular arrangement;
(c) a vertical slide member having vertically aligned indicia thereon illustrating a plurality of musical chords and indicators horizontally aligned with each said chord showing which of said musical notes are needed for making each said musical chord, said vertical slide member slideable within said vertical slot in said housing so that each said musical chord can be viewed along with said respective indicators vertically aligned with said musical notes on said horizontal slide member which comprise said chord;
(d) said horizontal slot in said housing and said horizontal slide member include a complementary tongue and groove track;
(e) a finger grip formed on one end of said horizontal slide member and extending at generally a right angle from said horizontal slide member for moving said horizontal slide member along said tongue and groove track in said housing, wherein said horizontal slot has two sides and is formed in a transparent top of said housing whereby said horizontal slide member is exposed for unobstructed easy viewing and whereby said transparent top permits the desired indicators of a desired chord to be aligned with a side of said slot and viewed for proper coordination with the notes on the horizontal slide member to provide the desired chord;
(f) a clearance hole formed adjacent said finger grip in said horizontal slide member;
(g) a pivot pin mounted with said clearance hole;
(h) a handle secured to said pivot pin and extending outwardly from said clearance hole;
(i) a return spring positioned between said handle and said finger grip; and
(j) a leaf spring secured to said pivot pin at generally a right angle to said handle, said leaf spring extending through said clearance hole and normally engaging said housing in said horizontal slot, whereby pressing said handle against said grip causes retractions of said leaf spring into said hole releasing said slide for horizontal movement.

* * * * *